United States Patent [19]
Johnson

[11] 4,067,424
[45] Jan. 10, 1978

[54] REMOVABLE TOOL HOLDER WITH IMPROVED BUILT IN TORQUE RELEASE CLUTCH

[75] Inventor: Allan S. Johnson, Newport Beach, Calif.

[73] Assignee: Tapmatic Corporation, Irvine, Calif.

[21] Appl. No.: 712,595

[22] Filed: Aug. 9, 1976

[51] Int. Cl.² .............................................. F16D 43/20
[52] U.S. Cl. ................................ 192/56 R; 81/52.4 R
[58] Field of Search ............................ 192/56 R, 150; 81/52.4 R, 52.4 A; 173/12

[56] References Cited

U.S. PATENT DOCUMENTS

| | | | |
|---|---|---|---|
| 2,775,327 | 12/1956 | Gearhart | 192/56 R |
| 3,136,400 | 6/1964 | Carr | 192/56 R |
| 3,472,347 | 10/1969 | Johnson | 192/56 R |

*Primary Examiner*—Allan D. Herrmann
*Attorney, Agent, or Firm*—Herzig & Walsh Incorporated

[57] ABSTRACT

A readily removable tool holder constructed to be held in a receptacle which may be carried on the spindle of a tapping attachment. A torque release clutch is built into the removable tool holder for the purpose that when one tool holder is substituted for another, it is not necessary to make adjustments in the torque release clutch of the tapping attachment itself. The parts of the torque release clutch are of relatively small diameter to fit into the tool holder. Improvements are embodied in the torque release clutch. Clutch members are provided including a first clutch member and a second clutch member. The main biasing spring acts on the first clutch member. When the clutch parts are disengaged, the first member is moved against the spring and held in an inactive position wherein it is completely out of engagement with the teeth of the other clutch member to eliminate wear. The second clutch member is biased by a relatively light spring to provide just enough engagement between the clutch faces so that upon reversal such faces will re-engage.

10 Claims, 9 Drawing Figures

U.S. Patent    Jan. 10, 1978    Sheet 1 of 2    4,067,424
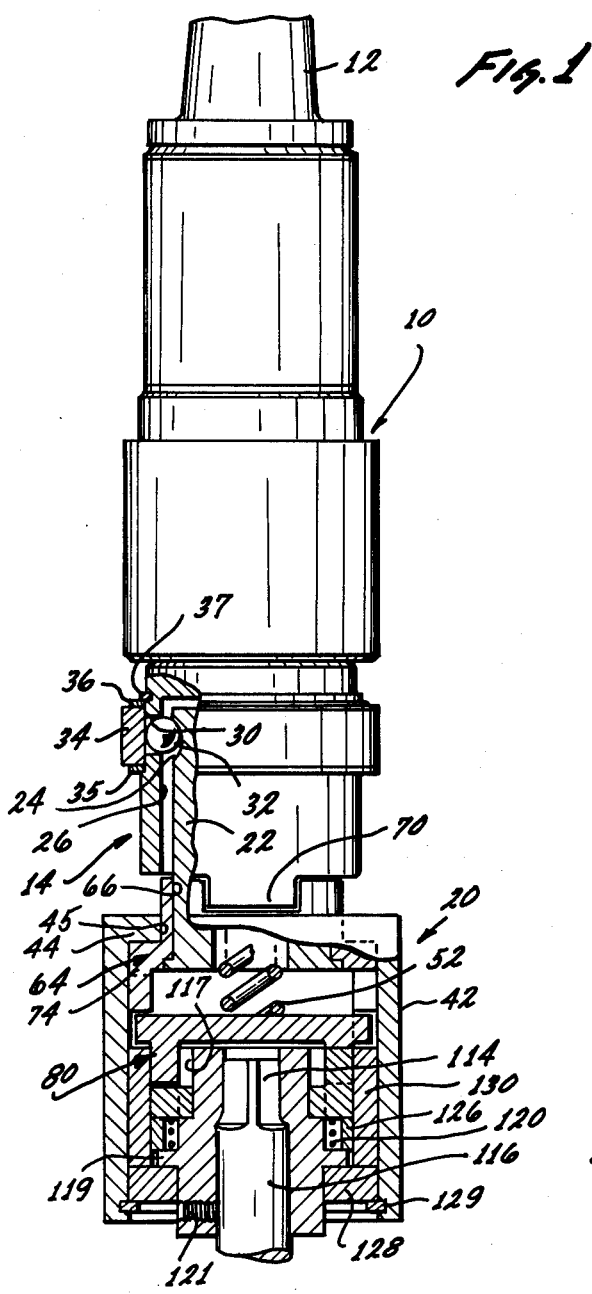
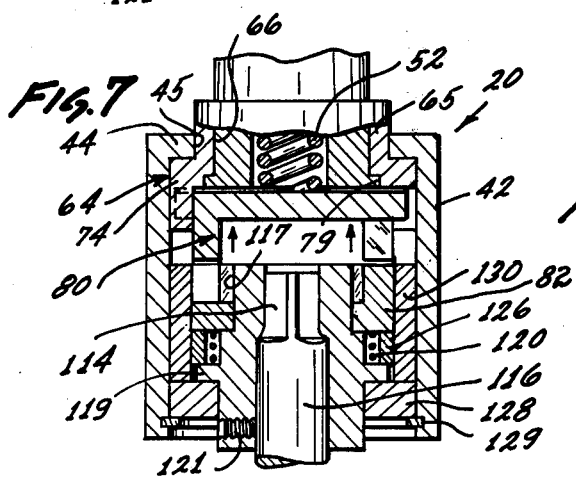
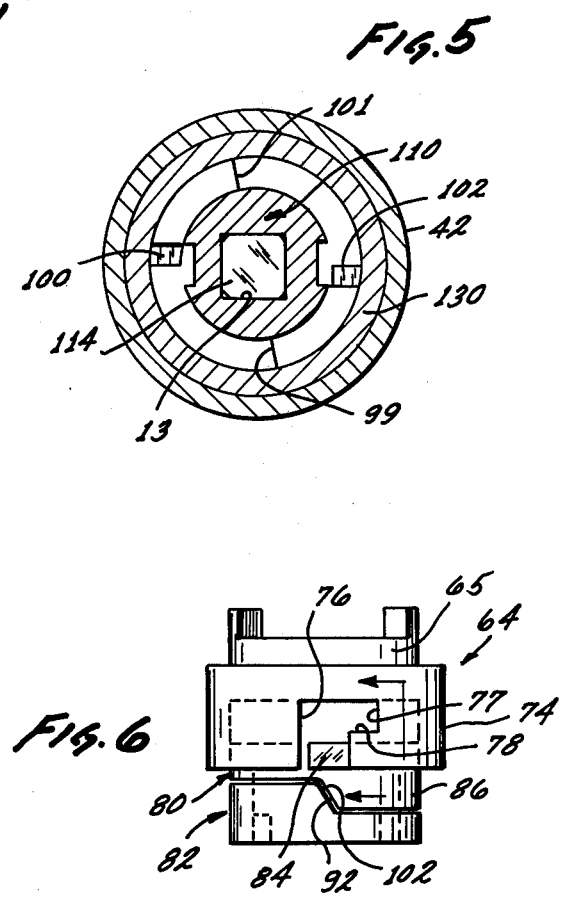
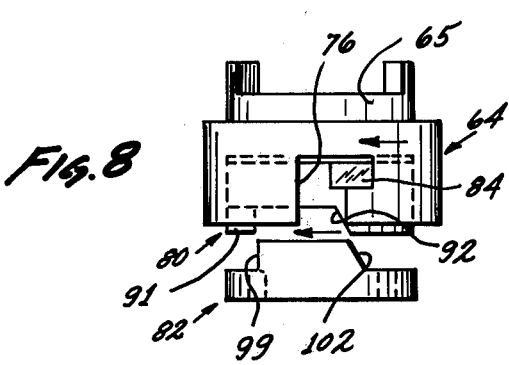
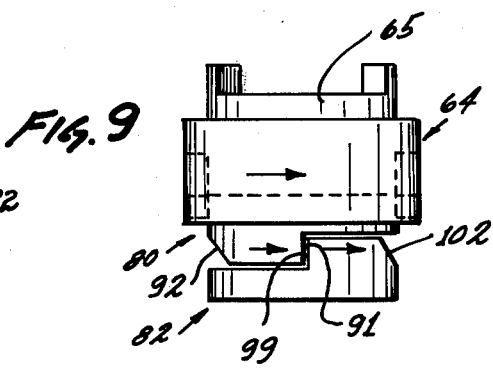

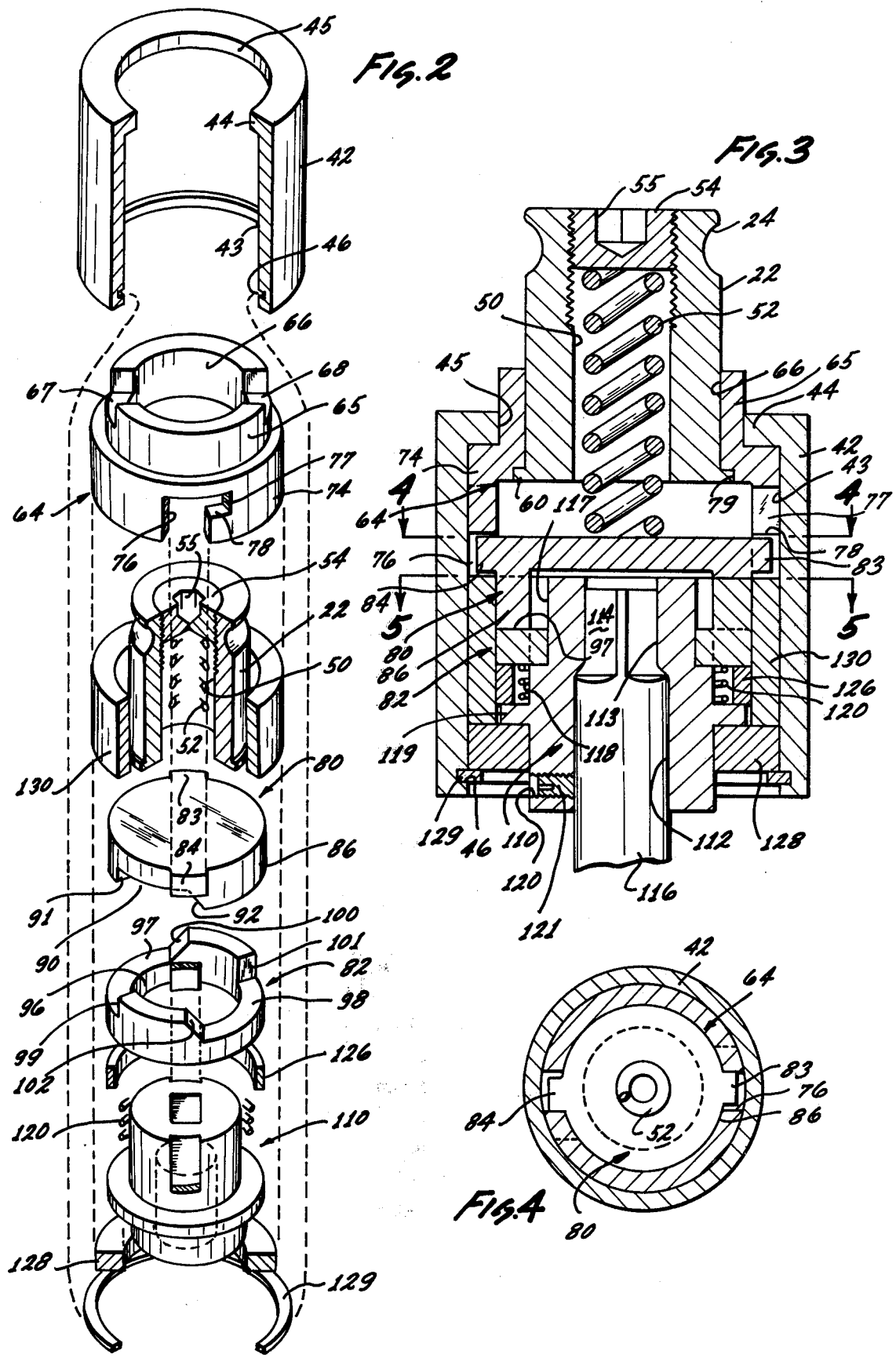

REMOVABLE TOOL HOLDER WITH IMPROVED BUILT IN TORQUE RELEASE CLUTCH

BACKGROUND OF THE INVENTION

1. Field of the Invention

The field of the invention is primarily that of removable tap holders adapted for use with tapping attachments. The invention is particularly concerned with removable tap holders having a built in torque release clutch. The components of such a clutch are of relatively small diameter since they are built into the removable tool holder. The improvements of the invention reside primarily in a torque release clutch having this adaptation.

2. DESCRIPTION OF THE PRIOR ART

The herein inventor's prior U.S. Pat. No. 3,472,347, is directed to a removable tool holder with built in clutch adapted for utilization in a tapping attachment. The clutch that is utilized in the herein invention is of the type shown in this inventor's prior U.S. Pat. No. 3,472,347, and also in the inventor's prior U.S. Pat. No. 3,791,756.

The patents referred to constitute the most pertinent prior art within the knowledge of the herein inventor. The prior art removable tap holder with built in clutch lacks a certain characteristic present in the improvement of the herein invention. Because of the relatively small size of the built in clutch, the spring which acts on one of the clutch members must be a relatively heavy spring. In the known devices, the clutch is disengaged and there is still some limited engagement between the teeth on the clutch members which may be in the amount of 0.015 to 0.020 thousandths. This engagement of the clutch faces is necessary to bring about re-engagement of the clutch on reverse rotation. This engagement, however, particularly in view of the relatively heavy spring, causes undesired wear to occur as between the teeth on the clutch faces. This disadvantage of the known prior art devices is overcome by the improvements of the herein invention.

SUMMARY OF THE INVENTION

As indicated in the abstract, the invention resides primarily in the improvement S in the torque clutch that is built into the removable tool holder. The parts of the clutch are relatively of small size and the spring that acts on one clutch member is a relatively heavy spring.

The clutch as previously set forth is of the type illustrated in U.S. Pat. Nos. 3,472,347 and 3,791,756, which are hereby incorporated herein by reference. There is a first clutch member which is biased by relatively strong spring and which, upon disengagement of the clutch members, is moved into a lifted and held or parking position. This position in the herein invention is such that the clutch teeth on this part are fully out of engagement with the clutch teeth on the other part, so that the biasing spring is held in a fully inactive position. The clutch embodies a second member having clutch teeth. This member is constructed and arranged relatively with respect to the parts of the clutch and is associated with a light spring which biases it in a direction so that the teeth engage relatively lightly with the teeth on the other clutch member. This amount of engagement is not sufficient to occasion any significant wear, but it is sufficient so that upon reverse rotation, the clutch parts are again moved into clutching engagement.

In the light of the foregoing, the primary object of the invention is to improve the characteristic in a built in clutch in a removable tap holder to eliminate a degree of engagement between clutch faces or clutch teeth on the clutch parts when the clutch is disengaged, such as would cause excessive and undesired wear.

A further object is to realize the result set forth in the foregoing by way of a clutch design having first and second clutch parts, one part being biased by a spring and so arranged that when the clutch is disengaged, the first part is held in an inactive position wherein the biasing spring is inactive and the teeth of clutch parts are not in engagement, the second clutch part being biased by relatively light spring enough to provide sufficient engagement between the clutch parts so that re-engagement will occur upon reverse rotation.

Further objects and additional advantages of the invention will become apparent from the following detailed description and annexed drawings.

FIG. 1 is a cross-sectional view of a preferred form of the invention being shown in association with a tapping attachment;

FIG. 2 is an exploded view of the tap holder shown in FIG. 1;

FIG. 3 is a cross-sectional view of the tap holder shown in FIGS. 1 and 2;

FIG. 4 is a sectional view taken along the line 4—4 of FIG. 3;

FIG. 5 is a sectional view taken along the line 5—5 of FIG. 3;

FIG. 6 is an illustrative view showing the normal driving relationship of the clutch parts;

FIG. 7 is a cross-sectional view similar to that of FIGS. 1 and 3 showing the clutch parts in disengaged relationship;

FIG. 8 is a view similar to that of FIG. 6 illustrating the parts in disengaged relationship;

FIG. 9 is a view similar to FIGS. 6 and 8 showing the parts in driving relationship for reverse drive.

DESCRIPTION OF THE PREFERRED EMBODIMENT

Referring to FIG. 1, numeral 10 designates the body of a tapping attachment having a stem 12 that may be received in a fitting of a driving machine. As shown the tapping attachment 10 is of a non-reversing type and may have a construction like that of U.S. Pat. No. 3,472,347 or application Ser. No. 689,208, filed May 24, 1976, which is hereby incorporated herein by reference. The tapping attachment has a spindle of the free floating type and carried by the spindle is a receptacle 14 which receives and carries the tool holder designated generally at 20.

The receptacle 14 is preferably like that of U.S. Pat. No. 3,791,756, which is hereby incorporated herein by reference.

The tool holder 120 has an extending stem part 22 at the upper end of which is an annular groove 24 of arcuate cross section. The receptacle 14 has a bore 26 with stem 22 extending into this bore. In the side walls of the receptacle 14 are diametrically opposed openings, one of which may be seen at 30. These openings have an inward taper as shown. Received within the openings are balls, one of which is shown at 32 and these balls engage in the annular groove 24 normally to hold the stem 22 of the tool holder in position.

Fitting around the receptacle 14 is a ring 34 rotatably positioned between guide members 35 and 36, held in position by snap ring 37. The ring 34 has diametrically opposed recesses on the inside thereof. It can be rotated, that is, moved angularly to allow the balls 32 to move outwardly into the recesses to release the stem 22 of the tool holder for removing it from the receptacle to be replaced by a second one.

Tool holder 20 is shown more in detail in FIGS. 2–9. It will be understood that it embodies in it a torque release clutch. It is common for tapping attachments to embody an adjustable torque release clutch in the drive thereof. When a change in tapping tools is made, it is frequently necessary to adjust the torque release clutch. With the herein invention, if one tap holder is substituted for another with a different tool, no adjustment of a torque release clutch is required because each tap holder embodies a torque release clutch.

FIGS. 1 and 3 illustrate the clutch in the tap holder 20 in driving relationship. The relationship of the parts will be best understood from FIGS. 2 and 3. The tap holder embodies a cylindrical housing 42 having a bore 43. It has an inwardly extending flange 44 at the top providing a top opening 45. On the inside near the bottom is an annular grove 46 for receiving a snap ring.

The stem 22 is cylindrical and has a bore 50 in which is a coil spring 52. The upper end of the bore 50 is threaded as shown and it receives a threaded plug 54 having a socket opening 55. At the bottom of the stem 22 is an extending flange as designed at 60.

Numeral 64 designates the clutch driving sleeve. It has an upper cylindrical part 65 having a bore 66, this part being of a slightly smaller diameter and having diametrically opposed side cut outs 67 and 68.

The receptacle 14 has downwardly extending diametrically opposed lug parts, one of which can be seen at 70 in FIG. 1 and these lug parts fit into the cut outs 67 and 68 so that the member 64 is driven by the spindle of the tapping attachment. The lower part of the clutch sleeve 64 is in the form of a skirt 74 and formed in this skirt in diametrically opposed positions are cut outs, one of which is designated at 76 in FIG. 2. This cut out has a lateral or circumferential part as designated at 77 which forms a shoulder or ledge as designated at 78.

The stem 22 fits into the bore 66 in the clutch sleeve 64 and its flange 60 engages a bore 79 of slightly larger diameter within the clutch member 64.

Numeral 80 designates the upper clutch drive member and numeral 82 designates the lower clutch drive member. The clutch member 80 is circular as shown, having diametrically opposed radially extending lugs as designated at 83 and 84. At its underside there is a skirt 86 having diametrically opposed cutouts, one of which is designated at 90 in FIG. 2. At one end or side of the cutout, there is a flat axial surface 91; at the other end of the cutout is a slanting surface 92. The lugs 83 and 84 are constructed to cooperate with the cutouts 76 previously described in the member 64.

The clutch member 82 is cylindrical, having a bore 96. Its upper end forms a skirt having in it cutouts 87 and 98 that are complementary to the cutouts in the clutch member 80. The cutout 97 has a straight axial surface 99 at one end and a slanting surface 100 at the opposite end. The cutout 98 has straight axial surface 101 at one end and a slanting surface 102 at the opposite end.

Numeral 110 designates a tool holder bushing member. It has a bore 112 and a smaller counterbore 113 that receives the square end part 114 of tool 116. It has an upper diameter 117; a larger intermediate diameter 118 and a still larger diameter 119 forming an extending flange. It has a lateral threaded bore 120 in its side that receives a set screw 21 that holds the tool 116.

The lower clutch member 82 fits around the upper part of the bushing 110 as shown, surrounding the diameter 118 of the bushing 110 is a relatively light coil spring 120 and positioned outwardly of the coil spring below the member 82 is a spacer ring 126. Flange 119 rests on a spacer ring 128, that, is in the side of the housing 42 which rests on a snap ring 129 in an annular groove on the inside of the housing 42. Numeral 130 designates a sleeve or cylinder, the upper part of which is around the upper clutch member 80 and the lower part of which rests on the spacer ring 128.

OPERATION

The operation of the tapping attachment is conventional and is illustrated in the other patents referred to herein. The tap holder 20 can be removed from the receptacle 14 in the manner described in the foregoing.

In the event that tool or bit 116 should bind such that it is not able to turn, the torque release clutch built into the tap holder 20 will operate. The clutch members will separate and the upper one will move into an upper held or parked position until the direction of rotation is reversed. FIG. 7 shows the torque release clutch in the upper held or parked position. FIGS. 6–9 illustrate the operation. FIG. 6 illustrates the normal operation wherein complementary slanting surfaces on the upper and lower clutch members 80 and 82 are in engagement so that the tapping bit is being driven.

FIG. 8 shows the position of the parts wherein the upper clutch member 80 is held in a parked position. In this position the clutch faces of the upper clutch member 80 and the lower clutch member 82 are entirely out of engagement. The upper clutch member 80 is held in the parked position against the relatively heavy spring 52. The lower clutch member 82 is held upwardly in position by the relatively light sping 120 which is sufficient to provide a very limited amount of engagement between the extending parts of the upper clutch member 80 and lower clutch member 82 so that upon reversal, the parts will operate as will be described. The engagement between the clutch members is insufficient to cause any significant wear.

Upon reversal of the direction of rotation of the attachment indicated by the arrows in FIG. 9, lugs 83 and 84 will move off the respective circumferential ledges they are retained on, and will move back into the axial part of the slots such as designated at 76. This permits the faces of the clutch members 80 and 82 to come into engagement as illustrated in FIG. 9 wherein the axial surfaces are in abutting relationship with each other for reverse drive, that is, for drive in the opposite direction.

From the foregoing, those skilled in the art will readily understand the nature and construction of the invention and the manner in which all of the objects as set forth in the foregoing are realized.

The foregoing disclosure is representative of a preferred form of the invention and is to be interpreted in an illustrative rather than a limiting sense. The invention to be accorded the full scope of the claims appended hereto.

I claim:
1. An adjustable torque clutch adapted for providing driving engagement between a driving shaft and a driven shaft, the clutch comprising a first element carried by one of said shafts and axially movable relative thereto, a second element carried by the other shaft and axially movable relative thereto, means axially biasing the said first element, the said elements being interengageable to transmit torque from one shaft to the other, the said elements having mutually engageable surfaces constructed whereby when torque is transmitted through the elements, the said first element tends to move axially in a direction to disengage the elements, the improvement comprising means whereby upon predetermined axial movement of the first element, it is in an axial position wherein said biasing means is held in a fixed position thereby, and means positioned to act on the second element to urge said element in a direction to provide for a limited amount of engagement between the first and second elements when they are disengaged for purposes of transmitting torque.

2. A torque clutch as in claim 1, a tool holder having said clutch within it, the tool holder having a part constructed to be received and held by a tapping attachment.

3. A torque release clutch as in claim 1, said last means including a relatively light biasing spring positioned to act on said second element in a manner whereby the clutching surface of said element is in limited engagement with the clutching surface of the first element.

4. An adjustable torque clutch as in claim 1 including a sleeve member carried by one of the said shafts, the said first element having a radial projection means cooperable with said member, whereby said element can be held in an axial inactive position.

5. A torque clutch as in claim 4 wherein said member has a skirt portion having slot means in its end, the slot means having an axial portion and a circumferential portion, said first element having a radial projection adapted for engagement in the slot means to hold the first element in an inactive position.

6. In a torque clutch adapted for providing driving engagement between a driving shaft and a driven shaft, wherein the clutch has first and second clutch elements, one of which is axially movable relative to the other between clutch engaged and clutch disengaged positions, there being biasing means acting on the element that is axially movable relative to the other, and the clutch having means for holding the one element in disengaged position agaisnt the biasing means, the improvement embodying the said means being constructed to hold the one element in an inactive position wherein the first and second clutch elements are out of engagement, and biasing means acting on the second element whereby in clutch disengaged position, the said elements have limited engagement sufficient to cause the elements to be brought into clutching engagement upon reverse rotation.

7. The torque clutch as in claim 6 wherein the said biasing means acting on the second element is constructed to exert only limited force insufficient to cause any significant wear as between the clutching surfaces of the first and second elements when they are not in clutch-engaging relationship.

8. An adjustable torque clutch for providing driving engagement between a driving shaft and a driven shaft, the clutch comprising a first element carried by one of said shafts and axially movable relative thereto, a second element carried by the other shaft and axially movable relative thereto, means axially biasing said first element, said first and second elements being interengageable to transmit torque from one shaft to the other, said first and second elements having mutually engageable surfaces configured such that when torque is transmitted through said elements, said first element tends to move axially in a direction to disengage said elements, means positioned to act on said second element to urge said element axially to provide a limited amount of engagement between said first and second elements when they are disengaged for purposes of transmitting torque.

9. The invention as set forth in claim 8 wherein said first element comprises a first clutch drive member, said first clutch drive member including a first clutching surface and further including a second clutch member, said second clutch member including a second clutching surface whereby said first and second clutching surfaces are in limited engagement when said first and second clutching members are disengaged for purposes of transmitting torque.

10. The invention as set forth in claim 9 wherein said first clutch member comprises a generally cylindrical configuration including a cutout portion defining said first clutching surface and wherein said second clutch member comprises a generally cylindrical configuration including a cutout portion defining said second clutching surface.

* * * * *